United States Patent
Haywood et al.

(10) Patent No.: US 8,689,275 B2
(45) Date of Patent: Apr. 1, 2014

(54) METHOD OF EVALUATING THE PROFIT OF A SUBSTREAM OF ENCODED VIDEO DATA, METHOD OF OPERATING SERVERS, SERVERS, NETWORK AND APPARATUS

(75) Inventors: Richard James Haywood, Spetchley (GB); Xiaohong Peng, Birmingham (GB)

(73) Assignee: Xyratex Technology Limited, Havant (GB)

( * ) Notice: Subject to any disclaimer, the term of this patent is extended or adjusted under 35 U.S.C. 154(b) by 406 days.

(21) Appl. No.: 12/938,147

(22) Filed: Nov. 2, 2010

(65) Prior Publication Data

US 2012/0106612 A1 May 3, 2012

(51) Int. Cl.
*H04N 7/16* (2011.01)
*H04N 7/173* (2011.01)
*H04N 11/02* (2006.01)
*H04N 5/14* (2006.01)

(52) U.S. Cl.
USPC ............ 725/145; 725/91; 725/92; 725/114; 725/115; 725/144; 725/146; 375/240; 375/240.01; 375/240.02; 375/240.27; 348/193; 348/701

(58) Field of Classification Search
USPC .................. 725/90, 91, 92, 93, 98
See application file for complete search history.

(56) References Cited

U.S. PATENT DOCUMENTS

| | | | | |
|---|---|---|---|---|
| 7,028,096 | B1* | 4/2006 | Lee | 709/231 |
| 2007/0154065 | A1* | 7/2007 | Kellerer et al. | 382/100 |
| 2008/0259799 | A1* | 10/2008 | van Beek | 370/235 |
| 2009/0083279 | A1* | 3/2009 | Hasek | 707/10 |
| 2009/0219993 | A1* | 9/2009 | Bronstein et al. | 375/240.03 |
| 2010/0054329 | A1* | 3/2010 | Bronstein et al. | 375/240.03 |
| 2010/0091839 | A1* | 4/2010 | Wu et al. | 375/240.02 |
| 2011/0268134 | A1* | 11/2011 | Wee et al. | 370/468 |

OTHER PUBLICATIONS

J. Haywood, H.264 Data Partitioned Video Streaming, Aston University, Doctor of Philosophy, Jul. 2009, pp. 140-165.*
Kangasharju, J.; Hartanto, F.; Reisslein, M.; Ross, K.W., "Distributing layered encoded video through caches," Computers, IEEE Transactions on , vol. 51, No. 6, pp. 622,636, Jun. 2002.*
Richardson, "H.264 and MPEG-4 Video Compression", Wiley, 2003, 306 pages.
Hu, et al., "A Measurement Study of Internet Bottlenecks", Infocom 2005, Proceedings IEEE, vol. 3, 2005, pp. 1689-1700.
Liu, et al., "A survey on peer-to-peer video streaming systems", Peer-to-Peer Networking and Applications, vol. 1, No. 1, 2008, pp. 18-28.

(Continued)

*Primary Examiner* — Nasser Goodarzi
*Assistant Examiner* — Kyu Chae
(74) *Attorney, Agent, or Firm* — Pillsbury Winthrop Shaw Pittman LLP

(57) ABSTRACT

There is disclosed in aspects of the invention a method of evaluating the profit of a substream of encoded video data, a method of operating servers, a network and an apparatus. In the method, a data portion is identified comprising at least some of the data in the substream being evaluated; comparing a decoded version of the video with the data portion present and a decoded version of the video with the data portion removed and calculating an error metric indicative of the distortion between the two versions; and, calculating a profit for the substream dependent upon the error metric.

15 Claims, 11 Drawing Sheets

(56) References Cited

OTHER PUBLICATIONS

Wu, et al, "An Error Concealment Scheme for Entire Frame Losses for H.264/AVC", IEEE International Symposium on Circuits and Systems, 2006, pp. 4463-4466.

Kangasharju, et al., "Distributing Layered Encoded Video through Caches", IEEE Transactions on Computers, vol. 51, No. 6, 2002, pp. 622-636.

Wenger, "H.264/AVC Over IP", IEEE Transactions on Circuits and Systems for Videotechnology, vol. 13, No. 7, 2003, pp. 645-656.

Hu, et al., "Locating Internet Bottlenecks: Algorithms, Measurements, and Implications", SIGCOMM '04: Proceedings of the 2004 conference on Applications, technologies, architectures, and protocols for computer communications, New York, NY, USA: ACM, 2004, pp. 41-54.

Schwarz, et al., "Overview of the Scalable Video Coding Extension of the H.264/AVC Standard", IEEE Transactions on Circuits and Systems for Video Technology, vol. 17, No. 9, 2007, pp. 1103-1120.

Wiegand, et al., "Overview of the H.264/AVC Video Coding Standard", IEEE Transactions on Circuits and Systems for Video Technology, vol. 13, No. 7, 2003, pp. 560-576.

Kamaci, et al., "Performance Comparison of the Emerging H.264 Video Coding Standard With the Existing Standards", In proceedings IEEE International Conference on Multimedia and Expo, 2003, 4 pages.

Sen, et al., "Proxy Prefix Caching for Multimedia Streams", INFOCOM '99, Eighteenth Annual Joint Conference of the IEEE Computer and Communications Societies, Proceedings IEEE, vol. 3, 1999, pp. 1-26.

Zhang, et al., "Robust Video Transmission over Lossy Network by Exploiting H.264/AVC Data Partitioning", Proceedings of the Fifth International Conference on Broadband Communications, Networks, and Systems, 2008, 8 pages.

Miao, et al., "Scalable Proxy Caching of Video under Storage Constraints", IEEE Journal on Selected Areas in Communications special issue on "Internet Proxy Services", vol. 20, No. 7, 2002, pp. 1-34.

* cited by examiner

METHOD OF EVALUATING THE PROFIT OF A SUBSTREAM OF ENCODED VIDEO DATA, METHOD OF OPERATING SERVERS, SERVERS, NETWORK AND APPARATUS

The present invention relates in different aspects to a method of evaluating the profit of a substream of encoded video data, a method of operating a cache server, a method of operating a content server, servers, a network and an apparatus for evaluating the profit of a substream of encoded video data.

Preferred embodiments relate to data storage and data serving for large scale video on demand systems. Preferred embodiments have particular utility in web proxy caches and distributed cache networks, and in content distribution/delivery networks.

In recent years there has been a huge increase in the popularity of video on demand (VOD) services. To improve the availability of the services, caching video objects close to clients has become popular. FIG. 1 shows an example of a network where a cache 3 (also known as a cache server or web proxy) is provided between the content server 1 and the client 2. By caching video objects close to the client 2, reduced latency can be achieved between the cache 3 and the client 2, meaning that video playback can start more quickly. Furthermore, by caching within the same autonomous system (AS) 4 the packet loss rate can be significantly reduced because a local transmission is generally more reliable than a remote transmission. Indeed, it has been shown that 40% of bottlenecks occur on the links between autonomous systems.

It is widely agreed, however, that it is not possible to cache video in the same manner as standard web caching due to a video object having a high data rate and a long playback duration, meaning a much larger file size and greater period of time required for delivery. Furthermore, given the limited size of the cache 3, it is normally impractical for all videos to be stored in a cache 3 at a web proxy in their entirety, as several such large streams would exhaust the capacity of the cache 3. This means decisions must be taken as to how to best utilise the limited cache size in order to maximize the quality of service (QoS) perceived by clients 2.

Various schemes for caching video objects have been proposed in the prior art. For example, a decision may be taken to as to which videos should be stored at the cache 3 in priority over other videos, e.g. by giving priority to a caching a video that has been accessed most frequently or most recently.

Another scheme is to give priority to caching the start of a video stream. For example, see the paper S. Sen, J. Rexford, and D. Towsley, "*Proxy prefix caching for multimedia streams,*" INFOCOM '99. Eighteenth Annual Joint Conference of the IEEE Computer and Communications Societies. Proceedings. IEEE, vol. 3, pp. 1310-1319 vol. 3, March 1999. This document investigates storing the start of a video stream in cache resulting in lower response time, server load and network traffic. However, there is still a need in this scheme to stream the remainder of the video stream from the remote server to the cache in order to watch the whole video, and so the system still needs sufficient bandwidth to handle this. Also, this scheme is based on the assumption that viewers watch the video from the start to the end. This is often not the case due to the nature of playback of a lengthy streaming object. For example, during a playback, a client 2 often expects operations such as being able to fast-forward and rewind. In addition, media playbacks are often terminated prematurely by clients 2. This potentially complicates the decision of what video objects or which parts of video objects should be cached.

One form of caching network is a so-called "content distribution network" (CDN), which is a special-purpose network that provides scalability by distributing many servers across the Internet "close" to clients 2. As illustrated by FIG. 8, a CDN for data that is distributed via a wide area communication network will generally consist of a origin or content server 1 which contains the content and a set of proxy servers or cache servers 3 that each store a subset of the content closer to key client populations. Consumers obtain content from these cache servers 3 directly rather than from the content server 1. Current CDNs support traditional Web content fairly well, but support for streaming video content is typically less sophisticated. As will be appreciated, a key factor in the performance of a CDN is deciding which content should be stored at each cache server 3. Provisioning a CDN for stored media content is significantly more complex if the system delivers the content using one of the recently proposed scalable streaming standards.

Codecs are normally used when streaming video to compress video to reduce the bandwidth required to transport streams, or to reduce the storage space required to archive them. The video stream may be compressed using a non-layered encoder, where a single compressed bit stream is generated for the video. Alternatively, a layered (or scalable) encoder may be used to encode the video stream into multiple layers (or substreams), which are encoded in a way that makes progressive reconstruction of the video at increasingly higher quality possible. The output from the layered encoder is arranged in a hierarchical structure of cumulative layers, so that the more layers that are used in the decoding process, the higher is the quality of the reconstructed video. The most significant layer, called base layer, is essential to decoding the video and contains the data representing the most important features of the object. The additional layers, called enhancement layers, are optional to decoding the video and contain the data that can progressively refine the quality.

Thus, layered encoding allows a client to subscribe to a subset of cumulative layers to reconstruct a stream commensurate with its capability. Various different techniques have been proposed and utilised to generate a layered video bit stream. Nonetheless, layered codecs are currently not widely used because of a significant reduction in coding efficiency and an increase in decoder complexity, compared to non-layered codecs.

Kangasharju, J., Hartanto, F., Reisslein, M., and Ross, K. W. (2002); "*Distributing Layered Encoded Video Through Caches*"; IEEE Transactions on Computers, 51(6), pp. 622-636. Kangasharju et al. discuss caching strategies for minimising the blocking probabilities of streaming layered encoded video. They assumed that, for layered caching, the cached portions are semi-static and only completed layers are cached. They developed heuristics based on the popularity of the videos or the revenue brought in by the video streamed to the client at different levels of quality, which were maximised based on an analytical stochastic knapsack model to determine the preferable cache content.

The prior art generally has deficiencies in determining the value of video data by an objective, automatable means and how best to place a large volume of video content data in a distributed architecture to make best use of it.

According to a first aspect of the present invention, there is provided a method of evaluating the profit of a substream of encoded video data, the video data comprising plural substreams of encoded video data, the method comprising:

identifying a data portion comprising at least some of the data in the substream being evaluated;

comparing a decoded version of the video with the data portion present and a decoded version of the video with the data portion removed and calculating an error metric indicative of the distortion between the two versions; and, calculating a profit for the substream dependent upon the error metric.

Profit used here means a measure of the importance of a substream in the quality of the reconstructed video, i.e. achieving fidelity in reconstructing the source video from the encoded video data streams. Thus this method provides a objective and automatable measure of the importance of a substream. This allows the relative importance of different substreams to be compared subjectively by comparing profits of receiving each substream. The comparisons can be made between substreams in the same video, and/or between substreams of different videos. This is superior to prior art techniques for the comparison of distorted video sequences which rely on subjective feedback from audiences and/or test subjects.

This can have a multitude of uses. Examples are deciding which substreams to cache on a server, or which substreams to forward on a link having limited bandwidth.

A substream can be chosen by using suitable any scheme of separating encoded video data into different components or groups of components. For example, in a preferred embodiment where a H.264 partitioned data codec is used, a substream will be a stream of data units classified per a particular frame type (I-frame, P-frame or B-frame) and partition type (A, B or C partition), or for a particular combination of frame and partition types. Nonetheless, other video codecs can be used to generate substreams of video data, for example other partitioned codecs or layered video codecs could be used to create streams.

The error metric used is preferably based on finding the peak signal-to-noise ratio (PSNR). However, other choices for an error metric may be used.

The PSNR between videos can be simply found by finding and summing the mean square error between corresponding frames in the two versions of video being compared. This gives a quality measurement between the original and a compressed image. The higher the PSNR, the better the quality of the compressed, or reconstructed image or video sequence.

Whatever error metric is used when comparing the two versions of video, the error metric can be found by directly comparing the decoded version with the data portion present and the decoded version with the data portion removed. Alternatively, the two versions can be compared indirectly by first comparing each in turn with the original video, where available, and then comparing the results. In other words, the error metric can be found between the original video and the decoded version with the data portion present and between the original video and the decoded version with the data portion removed. The difference between these two values can be then found. This gives an error metric between the two decoded versions which compensates for the effects of distortion present due to the encoding/decoding of the video where a "lossy" codec is used.

In a preferred embodiment, the method comprises: separating the substream being evaluated into a plurality of said data portions and calculating said error metric for each data portion in turn; averaging the error metrics for the plural data portions; and, calculating the profit for the substream being evaluated dependent upon the averaged error metric.

Preferably the data portions are per frame or per slice, although multiple frames or slices could be used. Thus, the profit of a substream reflects the average effect that the loss of a frame or slice in that substream has on the decoded video stream.

According to a second aspect of the present invention, there is provided a method of operating a cache server, the cache server being connected in a network between one or more clients and a content server, and operable to cache objects requested from a client from the content server and to provide said cached object to a client when subsequently requested, the method comprising:

determining at the cache server the profit of the substreams in a video stream object requested by a client, the profit being determined in accordance with the method of the first aspect; and, caching the substreams with the higher profit in preference to substreams with lower profit.

This allows the profit of the videos available in the cache to be maximised to produce higher quality video from the user's point of view for a given cache capacity. This is useful in the case where the volume of videos exceeds the capacity of the server and it is not possible to store all videos at the cache. In this case, the cache server discards substreams with a lower profit from the cache in favour of newly arriving substreams with a higher profit. As shown by the tests described in the following detailed description, the preferred caching outperforms a conventional cache when the cache reaches its maximum capacity and new videos continue to arrive. Under these circumstances, the preferred caching aims to keep as many of the most important partitions as possible. In contrast, conventional caching treats all the partitions equally in this respect, instead for example simply caching newer videos in preference to older videos. As a consequence, the server profit of the preferred cache will continue to rise as the number of videos in the system increases, compared to the unchanged profit of a conventional cache. Furthermore, the client profit (relating to the received video quality) will reduce at a slower rate than that of the conventional cache. The preferred caching method can provide benefit even in a lossy environment because in this scenario the client profit is degraded more gracefully than that in the un-optimised scheme.

In a preferred embodiment, the method comprises: using a knapsack problem approach to maximising the total profit of videos stored at the cache server to decide which substreams to store at the cache.

Typically the parameters considered will be the profit values for the substreams, the weights of the substreams, i.e. their average size in bytes, and their availability, i.e. the length of the substreams in the video.

In a preferred embodiment, finding the profit of a substream comprises: determining the encoding parameters of the video stream; and, finding in a lookup table an average profit value for a substream encoded with those parameters.

Finding the profit of a substream may comprise calculating the profit for individual substreams. This is computationally expensive, but obtains a more accurate value of the profit of that substream, leading to a more optimal optimisation.

In another embodiment, finding the profit of a substream comprises:

determining the encoding parameters of the video stream; and, finding in a lookup table an average profit value for a substream encoded with those parameters.

A record of typical profit values for a typical video encoded with a particular encoding scheme are available to the cache server. When a new video arrives, the cache server identifies the encoding type of the video and looks up the appropriate profit values for its substreams. This avoids the need to decode the video streams at the cache.

An alternative variant of this arrangement is to assume that all videos seen by the cache have substreams having the same profit and to use average values for their profit, average size and average length. This again simplifies computational effort at the cache server.

Thus, there are a range of options at the cache server as to what it can do. It is a trade-off between the optimality of the profit estimates and the computational cost in generating these estimates. The use of the computationally simple option becomes possible when using the preferred method. This is in contrast with prior art approaches that use system meta-data which requires high levels of analysis in a cache server to generate. The preferred embodiments of the present invention benefit from the simplicity of the implementation, cutting the cost of the server network needed by removing the cost of the processing.

In a preferred embodiment, the method comprises: if a substream of a requested video is not in the cache, requesting the substream from the content server;

determining the profit of the substreams in a video stream not in the cache and requested from the content server, the profit being determined in accordance with the method of the first aspect; and, forwarding from the content server to the cache server the substreams with the higher profit in preference to substreams with lower profit.

The assignment of profits to the substreams in a video can also be used to select which substreams of a video to stream from the content server to the cache server when the available bandwidth between the two is at capacity. Again, the knapsack problem approach can be used to optimise the profitability of the forwarded substreams.

In a preferred embodiment, the method comprises:

setting a minimum value for the number of instances of a video that persist in a caching network of cache servers;

maintaining said minimum number in said caches of said cache servers; and, using any additional capacity in the cache servers to store substreams in accordance with their profit.

When the optimised caches are formed as a caching network, it can be ensured that all the partitions of each video will remain somewhere in the network, instead of being deleted entirely as happened in the case where a single cache is used. The required number of the servers or the proportion of space allocated for long term storage of videos in the network can then be determined. The spare capacity in each cache server can be used to store higher value part-streams at each cache server. Thus, this embodiment can strike an improved balance between making sure a certain number of instances of a video or substreams of a video persist in the system, and also optimising server capacity by storing the most important substreams in preference to less important substreams.

According to a third aspect of the present invention, there is provided a method of operating a content server, the content server being operable to forward substreams of video data stored at the content server in response to requests, the method comprising:

receiving at the content server requests for substreams of video data;

determining the profit of the requested substreams, the profit being determined in accordance with the method of the first aspect; and, forwarding with the content server the substreams with higher profit in preference to substreams with lower profit.

In a preferred embodiment, the method comprises using a knapsack problem approach to maximising the total profit of videos forwarded by the content server.

Preferably, wherein finding the profit of a substream comprises:

determining the encoding parameters of the video stream; and, finding in a lookup table an average profit value for that a substream encoded with those parameters.

In another embodiment, finding the profit of a substream comprises calculating the profit for individual substreams.

According to a fourth aspect of the present invention, there is provided a server constructed and arranged to carry out the method described above.

According to a fifth aspect of the present invention, there is provided a network comprising at least one cache server constructed and arranged to carry out the method of the second aspect and at least one content server constructed and arranged to carry out the method of the third aspect.

According to a sixth aspect of the present invention, there is provided apparatus for evaluating the profit of a substream of encoded video data, the video data comprising plural substreams of encoded video data, the apparatus comprising:

an encoder arranged to receive and encode an original video file into a plurality of encoded video substreams;

a controller arranged to identify a data portion comprising at least some of the data in the substream being evaluated;

a decoder arranged to receive said video data and produce decoded a version of the video with the data portion present;

a decoder arranged to receive said video data and produce decoded a version of the video with the data portion removed;

a calculator for comparing the two versions, calculating an error metric indicative of the distortion between the two versions and calculating a profit for the substream dependent upon the error metric.

Preferably, the apparatus has an error concealer for concealing the errors in the decoded video caused by the missing data portion.

Preferably, the controller is arranged to separating the substream being evaluated into a plurality of said data portions and wherein said error metric is calculated for each data portion in turn;

wherein the calculator is arranged to average the error metrics for the plural data portions and to calculate the profit for the substream being evaluated dependent upon the averaged error metric.

Preferably, the error metric is the peak signal to noise ratio.

Embodiments of the present invention will now be described by way of example with reference to the accompanying drawings, in which.

1. H.264 CODING BACKGROUND

Figure 1:
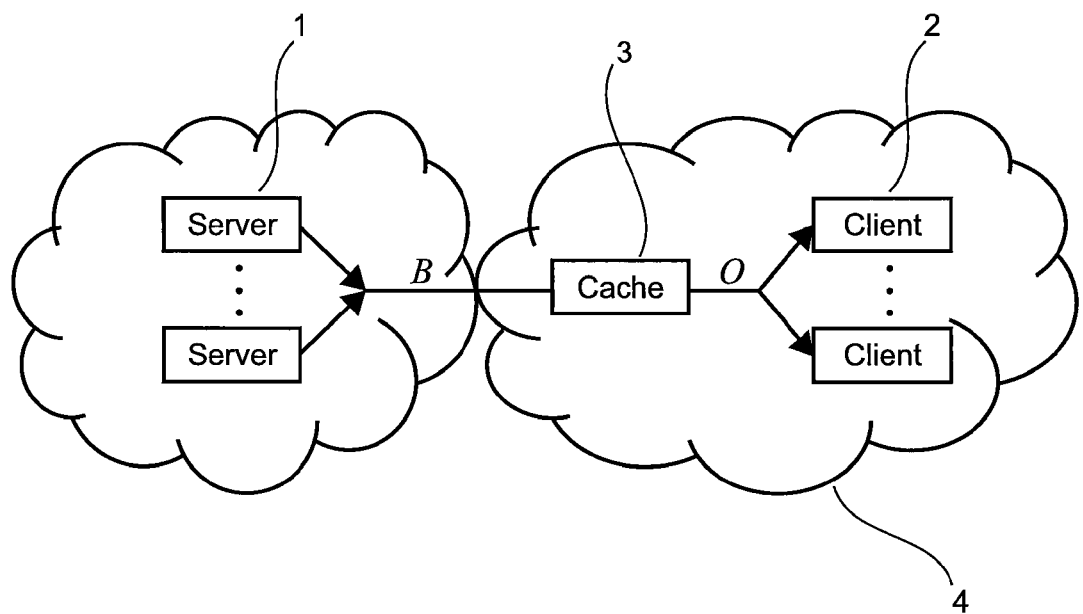
FIG. 1 shows schematically a cache interposed between one or more servers and one or more clients/users in a network.

As described in the following, a preferred embodiment of the present invention uses a H.264 data partition codec to encode video data into substreams. However, it will be appreciated that other standards can be used to generate substreams when encoding a video. In principle, any coding standard can be used. A brief overview of H.264 data partition coding is now given.

A video codec is designed to compress and uncompress digital video in order to reduce the amount of bandwidth required to transmit and store the video. H.264 is a video codec standard which can be used in various forms. H.264 can be used to generate a single layer of encoded video in which the video data is in one stream. Alternatively, H.264 Scalable Video Coding (SVC) has recently been developed to offer layered encoding of data. Compared with the single layered H.264 codec, the layered codec requires a 10% increase in bandwidth for the same fidelity, as measured by the peak signal-to-noise-ratio (PSNR). A further form is H.264 data partitioned video, which is part of the H.264 standards extended profile. H.264 data partitioned video takes no extra storage space compared to the non-partitioned case, as data partitioning is simply a reorganisation of the encoded data and does not result from the compression process itself. The present example uses a H.264 data partition codec to encode data into substreams.

To encode a video sequence using H.264 data partitioning it is first split down into a number of raw frames which are arranged together as a group of pictures (GOP). The encoded GOP is called a coded video sequence in the language of H264. Then each frame is compressed, using H.264, into one or more slices. A slice is a spatially distinct region of a picture that is encoded separately from any other region in the same picture. During the encoding process three different encoded slice types are produced, termed intra (I-slice), predicted (or inter) (P-slice) and bipredicted (B-slice).

In the present example, only one slice per frame is used. Thus, an I-frame is a frame consisting of a single I-slice, a P-frame is a frame consisting of a single P-slice, and a B-frame is a frame consisting of a single B-slice. However, in principle more than one slice per frame can be used, i.e. wherein an I-frame is a frame consisting of only I-slices, a P-frame is a frame consisting of only I-slices and P-slices, and a B-frame is a frame consisting of only I-slices, P-slices and B-slices.

Intra coded frames (or slices) are pictures coded without reference to any pictures except themselves. This means that it only requires the successful reception of its own packets in order to reconstruct the entire frame. Instantaneous Decoding Refresh (IDR) pictures, also called key frames, contain only intra coded slices. Every GOP starts with an IDR picture.

With the predicted and bipredicted frames (or slices), repetition is removed from the video stream through the use of prediction. These therefore require the prior decoding of some other frame or frames in order to be decoded. A predicted frame holds only the changes in the image from the previous frame, so saving space. Bipredicted frames use two frames as sources for prediction, e.g. by using differences between the current frame and both the preceding and following frames to specify its content, which further increase the coding efficiency. In both cases, for a frame to be fully reconstructable both its own packets and those making up the frames from prediction need to be received by the client.

When H.264 video is encoded without Data Partitioning, each slice of a frame is encoded into one Network Abstraction Layer (NAL) unit. When H.264 encodes frames with data partitioning enabled, up to three NAL units per slice are produced. The three NAL units are named partition A, B and C respectively. Partition A contains the most important elements of the slice, including the slice header, macroblock types, quantisation parameters, prediction modes and the motion vectors. Partitions B and C contain the residual information for the intra and inter coded macroblocks, respectively. If partition A is lost then partitions B and C must be discarded. However, if partition A is received then the quality of the displayed frame will be improved when partition B or C is received as well.

2. PROFIT CALCULATION

In accordance with an embodiment of an aspect of the present invention, the importance of a sub-stream on the quality of the video received is quantified by comparing a decoded version of the video stream with the component present and missing. Using H.264 video partitioning, a substream is the component of the stream corresponding to a particular frame type and partition type, e.g. all partitions of type B in all P-frames in the stream. The difference between the two decoded videos is the effect of the loss of that component on the video stream, in a preferred embodiment, this is measured using PSNR (peak signal-to-noise ratio). The components of the video whose loss results in the greatest reduction in the video quality are thus the most valuable.

PSNR profit, or simply termed profit, is defined as the PSNR difference between the decoded received video and a loss free copy of the video. The summation of the profits for each unit of a substream, i.e. units having a particular partition type and frame type, indicates what the effect of the loss of a substream has on the video quality. The value of receiving a substream is set as being the same as the inverse amount of the PSNR difference due to its loss. PSNR profit of a video is thus defined as $$P_V = \sum_{t \in \{K,I,B\}} \sum_{p \in \{A,B,C\}} P_{t,p} \quad (1)$$

Where t refers to IDR/Key (K), Inter (I) and Bipredicted (B) frames, and p refers to the partition type, i.e. $p \in \{A,B,C\}$. $P_{t,p}$ is the profit of receiving partitions of frame type t and partition type p. To reduce the effect of motion vectors a number of results need to be averaged. Thus the profit, $P_{t,p}$, for a substream, i.e. for a frame and partition pair, is defined as:

$$P_{t,p} = \frac{\sum_{r \in T_{t,p}} \sum_{f=1}^{F} (PSNR_f - PSNR_{f,r,p})}{|T_{t,p}|} \quad (2)$$

Where $T_{t,p}$ is a set containing the indexes of the frames of type t containing partition p, where $t \in \{K,I,B\}$ and $p \in \{A,B,C\}$. F is the number of frames within the video sequence. $PSNR_f$ refers to the PSNR value of the frame f which results from the compression of the video. $PSNR_{f,r,p}$ is the PSNR value of the frame f which has been compressed and has then received a loss of a partition of type p and in frame r. $PSNR_f$ and $PSNR_{f,r,p}$ are defined as follows:

$$PSNR_f = 20\log_{10}\left(\frac{MAX_I}{\sqrt{MSE_f}}\right) \quad (3)$$

Where $MAX_I$ is the maximum number of pixel values for the decoded frame and $MSE_f$ is the mean square error (MSE) of the compressed image is defined as:

$$MSE_f = \frac{1}{mn}\sum_{i=0}^{m-1}\sum_{j=0}^{n-1}(i_f(i,j)-K_f(i,j))^2 \quad (4)$$

Where $I_f$ is the original video frame f from within a video containing F frames. $K_f$ is frame f as a result of H.264 compression. (i,j) refers to the value of the pixel at location i,j. m and n are the width and height of the image respectively.

$$PSNR_{f,r,p} = 20\log 10\left(\frac{MAX_I}{\sqrt{MSE_{f,r,p}}}\right) \quad (5)$$

Where $MSE_{f,r,p}$, is the MSE for frame f from a video which has lost a partition, of type p, in frame r.

$$MSE_{f,r,p} = \frac{1}{mn}\sum_{i=0}^{m-1}\sum_{j=0}^{n-1}(i_f(i,j)-K_{f,r,p}(i,j))^2 \quad (6)$$

Where $K_{f,r,p}$ is frame f as a result of H.264 compression and experiencing the loss of partition p in frame r. Where data is missing within the frame recovery techniques are used, these are decoder specific and, in the decoder used, motion copy concealment is used.

Figure 2:
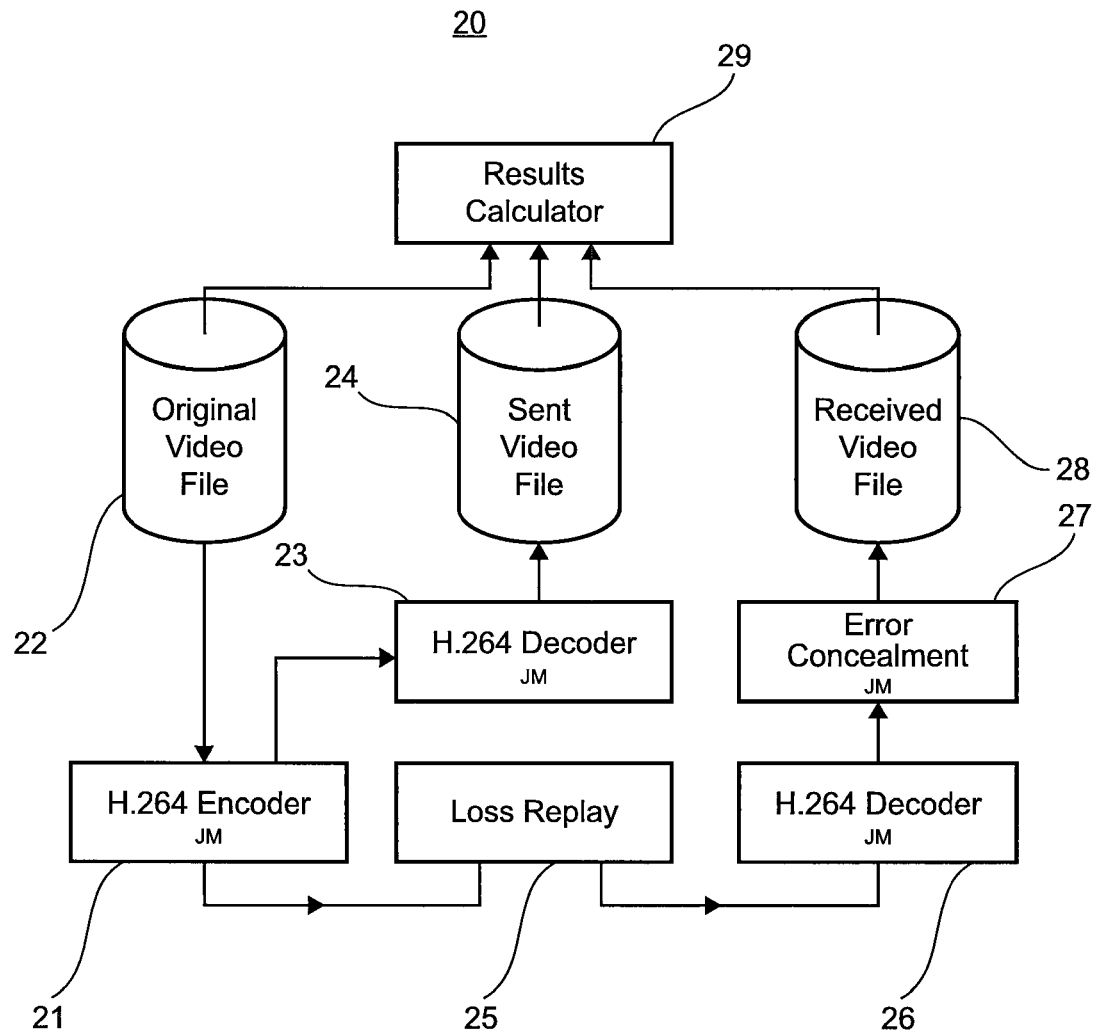
FIG. 2 shows schematically a test rig for calculating typical values for the profit of a video encoded with a particular codec in accordance with an embodiment of the present invention.

FIG. 2 shows an example of a test bed 10 for calculating profit values for a video. A H.264 encoder 21 first encodes the original video file 22 into a partitioned H.264 data stream. The test bed uses JM v13.2 to encode the video into a sequence of partitions. The GOP size is set to 72 frames, which is 3 seconds (µ=3) when the video is played at 24 frames per second. The GOP is constructed as a key frame followed by alternating bipredicted and intra coded frames.

A H.264 decoder 23 then decodes the encoded video into a send video file 24. This corresponds to the video seen by the user when the encoded video is perfectly reconstructed, i.e. with no loss of data. The send video file 24 will not be identical with the original video 22 in this example, as H.264 is a lossy encoding technique.

The "loss replay" block 25 removes a particular partition of a particular frame from the encoded data. The resulting incomplete stream is then decoded by a H.264 decoder 26. To compute PSNR the decoder 26 must produce complete frames using the received data. If any data is missing it is then up to the decoder 26 to manage this by use of an error concealment subsystem 27. The management of missing data might simply be to display what was presented at that location in the previous frame, to colour the errors black or to use a more intelligent technique. In a preferred example, the decoder 26 applies a motion copy concealment scheme in dealing with the missing data. The resulting video is stored in a received video file 28.

The loss replay block 25 repeats this process for all partition/frame pairs. The results calculator 29 then performs the calculations outlined above, i.e. finding the PSNR difference for a complete received video and a received video missing a particular frame partition pair, and then averaging these for all frame partition pairs in that substream to find the PSNR for the decoded video. The profit for the substream is calculated from this profit.

As an example, typical profit values were calculated by taking a ten minute CIF video sequence, from the film Goldeneye, and using the test bed 20 shown in FIG. 2 to calculate the profit resulting from the loss of each type of frame and partition. The averaged results are presented in table I.

TABLE I

AVERAGE PSNR PROFIT PER FRAME AND PARTITION TYPE

|  | Key Frame | Inter Frame | Biprediction Frame |
|---|---|---|---|
| A Partition | 1890.63 | 473.07 | 9.7 |
| B Partition | 509.21 | 266.91 | 4.16 |
| C Partition | 179.54 | 1.46 |  |

Thus, an objective, automatable value can be assigned to the different parts in a video reflecting the importance of receiving that part of the video in the quality of the decoded video. By applying a mathematical test in a machine the value ascribed to an individual data stream is repeatable and has direct comparison between one video sequence and another. This is superior to prior art techniques for the comparison of distorted video sequences which rely on subjective feedback from audiences and/or test subjects.

3. CACHE OPTIMISATION

With reference to FIG. 1, when a video or parts of a video are requested by a client 2 which are not stored at the cache 3, the cache 3 requests the missing parts from the origin content server 1 so these can be provided to the client 2. If there is sufficient space at the cache 3 then the complete video is stored in the cache 3. However, if there is insufficient space, then only the most valuable parts of the video are stored at the cache 3 and to make space for these the less valuable parts of other videos are removed from the cache 3. The cache server 3 keeps a record of the profit of the substreams stored in the cache 3. The value of the parts of the video are calculated using the profit model described above.

Preferably the cache server 3 maintains tables of typical values for video encoded with various different codecs. Thus, the cache server 3 just has to identify the type of encoding of a video and look up appropriate values in the tables to find the profit of a substream, and thus does not have decode each video and to perform lengthy computation for each video that is requested.

Alternatively, the cache server 3 can calculate the profits of the actual substreams arriving at the cache server 3 from the content server 1. This will give better results, but at the expense of more computational effort at the cache server 3.

The storage of partitions in the cache 3 can be seen as a knapsack problem, the study of which is well known in the art per se. The target of a knapsack problem is to maximise the profit from the contents of the knapsack, which has a restriction on the amount of weight it can carry. The caching of video is taken to be a bounded knapsack problem having has three parameters, weight, profit and availability. This uses the method for calculating profit $P_{t,p}$ proposed in section II and thus the values from table I. In addition to profit $P_{t,p}$, the weight $W_{t,p}$ is defined as the average size of the partitions in bytes (presented in table II) and the availability $A_{t,p}$ is defined as the average number of each partition in a two hour video, D=7200 seconds. The numbers for the availability of each partition are taken by encoding the film Goldeneye, the values are presented in the table IV, and for the availability used in the calculations these values are multiplied by the number of videos in the system, V.

TABLE II

AVERAGE SIZE OF A PARTITION IN BYTES, $W_{t,p}$

|  | Key Frame | Inter Frame | Biprediction Frame |
| --- | --- | --- | --- |
| A Partition | 3466.52 | 811.36 | 299.82 |
| B Partition | 1294.49 | 652.08 | 148.41 |
| C Partition |  | 483.56 | 177.79 |

TABLE III

PROFIT PER BYTE

|  | Key Frame | Inter Frame | Biprediction Frame |
| --- | --- | --- | --- |
| A Partition | 0.55 | 0.58 | 0.03 |
| B Partition | 0.39 | 0.40 | 0.02 |
| C Partition |  | 0.37 | 0.01 |

TABLE IV

AVERAGE NUMBER OF PARTITIONS, $A_{t,p}$, IN A TWO HOUR VIDEO

|  | Key Frame | Inter Frame | Biprediction Frame |
| --- | --- | --- | --- |
| A Partition | 1188 | 85200 | 86388 |
| B Partition | 1188 | 83304 | 37716 |
| C Partition |  | 82824 | 71292 |

Using tables I, II and IV an optimised number of partitions can be stored on a cache server 3 with capacity C bytes to maximise the profitability of the partitions stored. Table III shows a calculation of the PSNR profit per byte. The order of the selection for the inclusion of partitions is based in the highest PSNR profit per byte. We define an optimised allocation, $s_{t,p}$ for t∈{K,I,B} and p∈{A,B,C}, as one which maximises the profitability of the partitions stored on the cache server 3 within the following bounds:

$$s_{t,p} \leq A_{t,p} \times V, t \in \{K, I, B\} p \in \{A, B, C\} \quad (7)$$

$$\sum_{t \in \{K,I,B\}} \sum_{p \in \{A,B,C\}} s_{t,p} \times w_{t,p} \leq C \quad (8)$$

Figure 3:
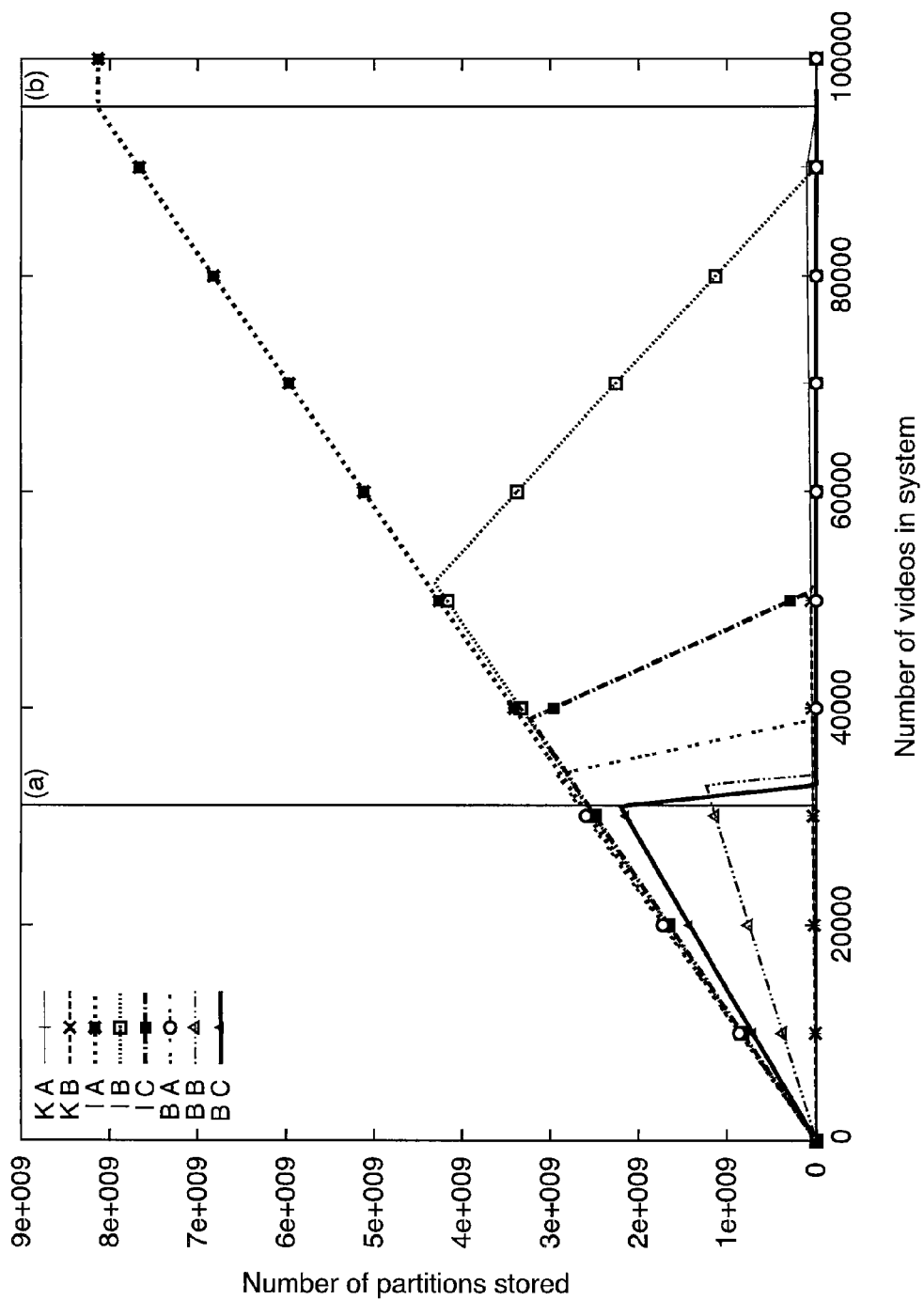
FIG. 3 shows optimised storage of partitions on a cache server with limited capacity with increasing numbers of videos in the system using an embodiment of the present invention.

FIG. 3 shows how the optimised number of partitions varies as the number of videos, V, within the system changes while the cache server capacity remains constant at C=6TB. In the range V=0 to 31000, marked "(a)" in the Figure, the cache server capacity is not fully used and all partitions are stored. In the range V=31000 to 95600, marked "(b)" in the Figure, the cache server capacity is fully used and the profit of the cache server 3 increases because less profitable partitions are removed to make space for more profitable partitions. When V=95600 the profitability of the cache server is maximised, where the profitability of the cache server is defined as $$P_s = \sum_{t \in \{K,I,B\}} \sum_{p \in \{A,B,C\}} s_{t,p} \times P_{t,p} \quad (9)$$

While the profit is optimised to maximise the profitability of the components stored at the cache server 3, in reality the revenue from a system will be dependent on the profit of the video stream received at the client 2. On the assumption that each video is equally important we can calculate the average profit of the video stream which is sent from the cache server 3 to the client 2. The profit per video from the cache 3 is defined as $$P_v = \frac{P_s}{V} \quad (10)$$

Figure 4:
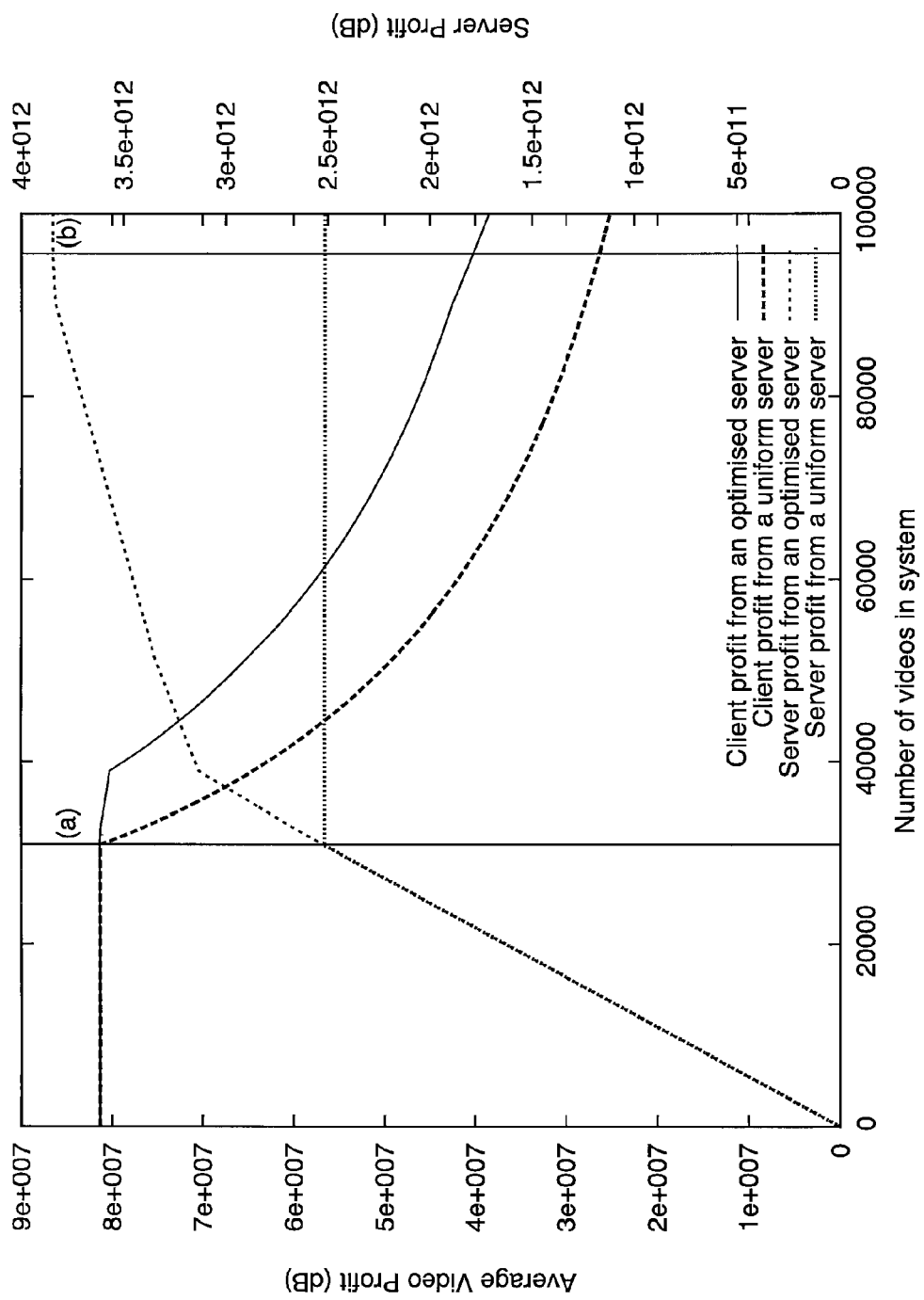
FIG. 4 shows the server profit and average video profit with increasing number of videos in the system.

FIG. 4 shows the average profit for each video stored. The Figure compares the optimal and uniform allocation of partitions on the server. In the uniform solution the number of each partition stored is proportional to the number available.

Figure 5:
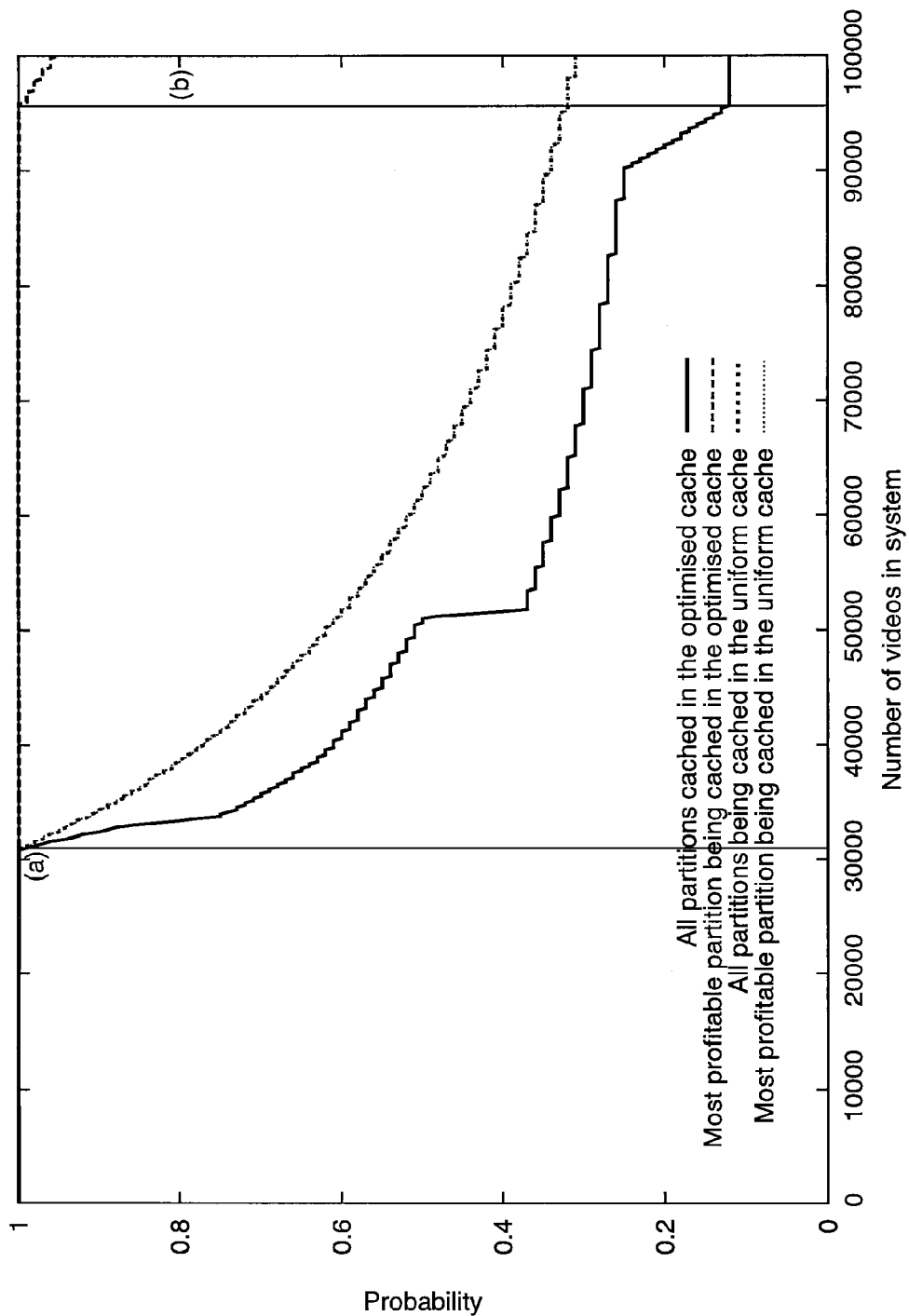
FIG. 5 shows cache access probabilities.

FIG. 5 shows the probability that any partition is available and that the most profitable are available in both the optimised and uniform scenarios. The Figure shows that in the optimal case the probability that any partition is present in the cache 3 falls quicker than in the uniform case, however even at its worse it is still only 20% lower than the uniform case. The benefit of the optimal system is that the probability that the most important partitions of the video is stored is much higher compared to the uniform case.

Thus, a cache server 3 operating using the principles described above has significant advantages over prior art arrangements. In particular, the most valuable per byte parts of the video are stored at the cache server 3. Through the storage of the most important elements of a video and the removal of lesser important elements of the video results in a greater value of video stored at the cache server 3. In this example, data partitioning is used to separate the video data into substreams. However, other suitable techniques could in principle be used to encode the video data into plural substreams that combine to give a frame, the removal of any of which does not render the frame missing but simply degraded, which can then be evaluated using the principles described in the foregoing.

Referring again to FIG. 1, the missing partitions of the video are preferably, although not essentially, streamed from another source to supplement the video stream from the cache 3 to improve the perceived decoded video for the user. FIG. 1 shows a cache server 3 which receives from the content server 1 the partitions of the video which it currently does not have in its cache 3 and streams those combined with the ones it has stored in its cache 3 to the client 2. With the addition of partitions from another source there are now four parameters which can be changed. The previous parameters already defined are C, the storage capacity of the cache 3, and V, the number of videos within the system. We now introduce two new parameters, the bandwidth between the cache 3 and the client 2, we term O, and the bandwidth between the origin content server 1 and the cache 3, we term B. Taking the average rate of the video, R, calculated from:

$$R = \frac{\sum_{t \in \{K,I,B\}} \sum_{p \in \{A,B,C\}} W_{t,p} \times A_{t,p}}{D} \quad (11)$$

The maximum number of clients which a cache server 3 can cope with is limited by:

$$R \times T < O \quad (12)$$

$$\sum_{t \in \{K,I,B\}} \sum_{p \in \{A,B,C\}} W_{t,p} \times (A_{t,p} - s_{t,p}) \quad (13)$$

Where T is the number of target clients. Making the assumption that the connection between the cache 3 and the client 2 is able to operate at 1 gigabit per second, $O=10^9$ bits/second, and the connection between the cache 3 to the content server 1 is 100 megabits per second, $B=10^8$. In reality there will be overheads which will affect the actual streaming rate but these are overlooked in this analysis for simplification. Additionally it is assumed in this analysis that the network bandwidth is the bottleneck and not the disk or server capabilities.

Figure 6:
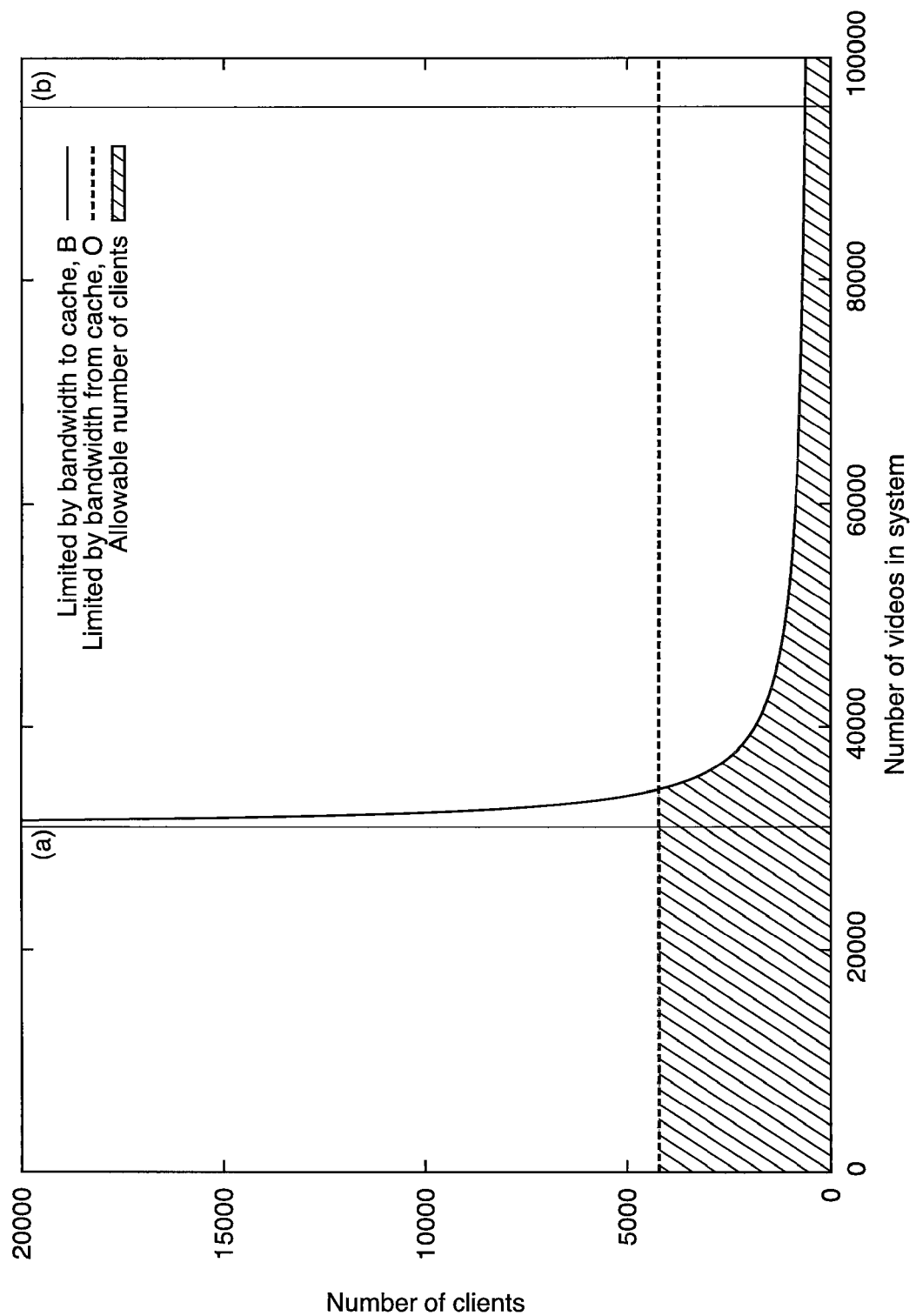
FIG. 6 shows the number of clients a system can serve depending on the number of videos in the system.

FIG. 6 shows the number of clients 2 which the system is able to serve a complete copy of the video and how this is affected by the number of videos stored at the cache 3. For the number of clients 2 limited by the cache 3 is always constant, as the amount of bandwidth which it has is finite, calculated using equation 12. The number of clients 2 limited by the bandwidth to the cache 3 is based on the calculation of the amount of additional data which has to be streamed to the cache 3 in order for the cache 3 to stream an entire video to the client 2, this is calculated using equation 13. Note that without the cache server 3, for this set of parameters, the number of clients 2 supportable would be limited to 421. When there are 100,000 videos the number of supported clients 2 is still over 40% higher than without the cache 3.

In a preferred embodiment of the present invention, the knapsack optimisation is applied to the bottlenecked bandwidth between the content server 1 and the cache 3. If the cache server 3 is missing a substream of a requested video, it requests that part from the content server 1 to forward to the client 2. The content server 1 then sends the most profitable of the substreams requested by the cache server 3. This functionality implemented at the content server 1. The content server 1 determines the profit of the requested substreams using any of the techniques described in the foregoing and uses the knapsack optimisation scheme described in the foregoing to maximise the profitability of the substreams forwarded over the bottlenecked link to the cache server 3. This provides a more graceful degradation in the quality of the video streamed to the client 2.

Figure 7:
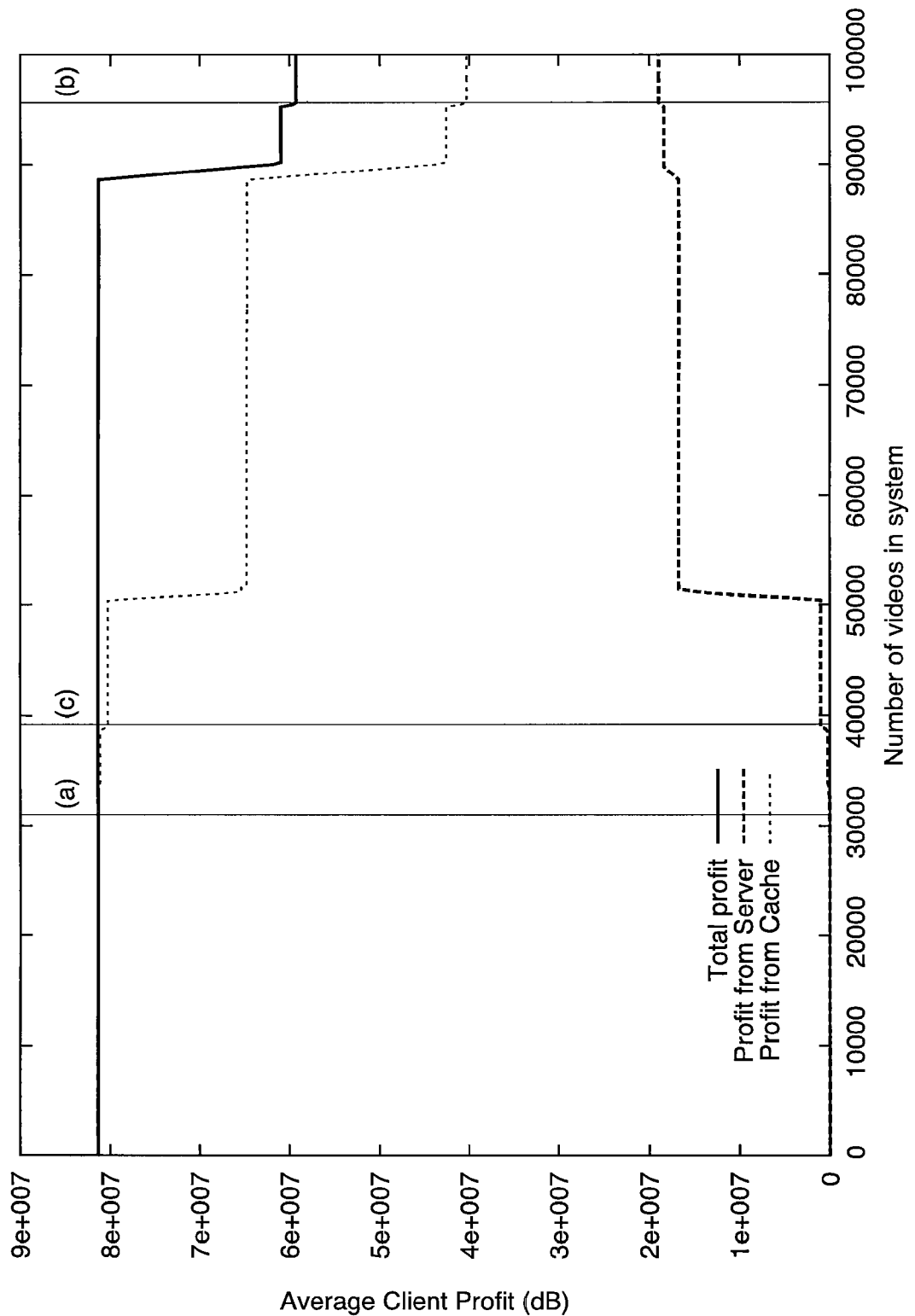
FIG. 7 shows the PSNR profit with increasing number of videos in the system.

FIG. 7 shows how the PSNR profit degrades when there are 2000 clients 2 each streaming different videos. From FIG. 6 it can be determined that for 2000 clients 2 no more than 39700 videos can be stored for a perfect copy of the video to be streamed to the client 2. This point is marked "C" in FIG. 7. FIG. 7 shows how the PSNR profit degrades with an increase in the number of videos stored at the cache 3. These results should be considered as an upper bound as it assumes that the partitions relating to the videos streamed to the 2000 clients are present at the cache 3 and as the number of videos in the system increases that these partitions are removed from the cache 3 last.

Thus, by using the knapsack optimisation approach at the cache server 3 to determine which substreams to cache and at the content server 1 to determine which substreams to forward to the cache server 3, it is possible to both reduce the storage needs at the cache server 3 and to reduce the bandwidth needs between the cache server 3 and the content server 1.

The effect of packet loss on the video profit received by the client is now considered. Assuming there is a uniform distribution of errors, then the profit of the videos streamed from the cache 3 to the client 2 is equal to $$P_c = \frac{s_{t,p}}{A_{t,p} \times V} \times (1 - L_O) \times P_{t,p} \quad (14)$$

Where $L_O$ is the loss probability on the stream from the cache 3 to the client 2. The profit of the videos streamed from the content server 1 to the cache 3 is equal to $$P_s = \left(1 - \frac{s_{t,p}}{A_{t,p} \times V}\right) \times (1 - L_O) \times (1 - L_B) \times P_{t,p} \quad (15)$$

Where $L_B$ is the loss probability on the stream from the content server 1 to the cache 3. The total profit for the streaming of a video is equal to $$P_t = P_c + P_s \quad (16)$$

Figure 8:
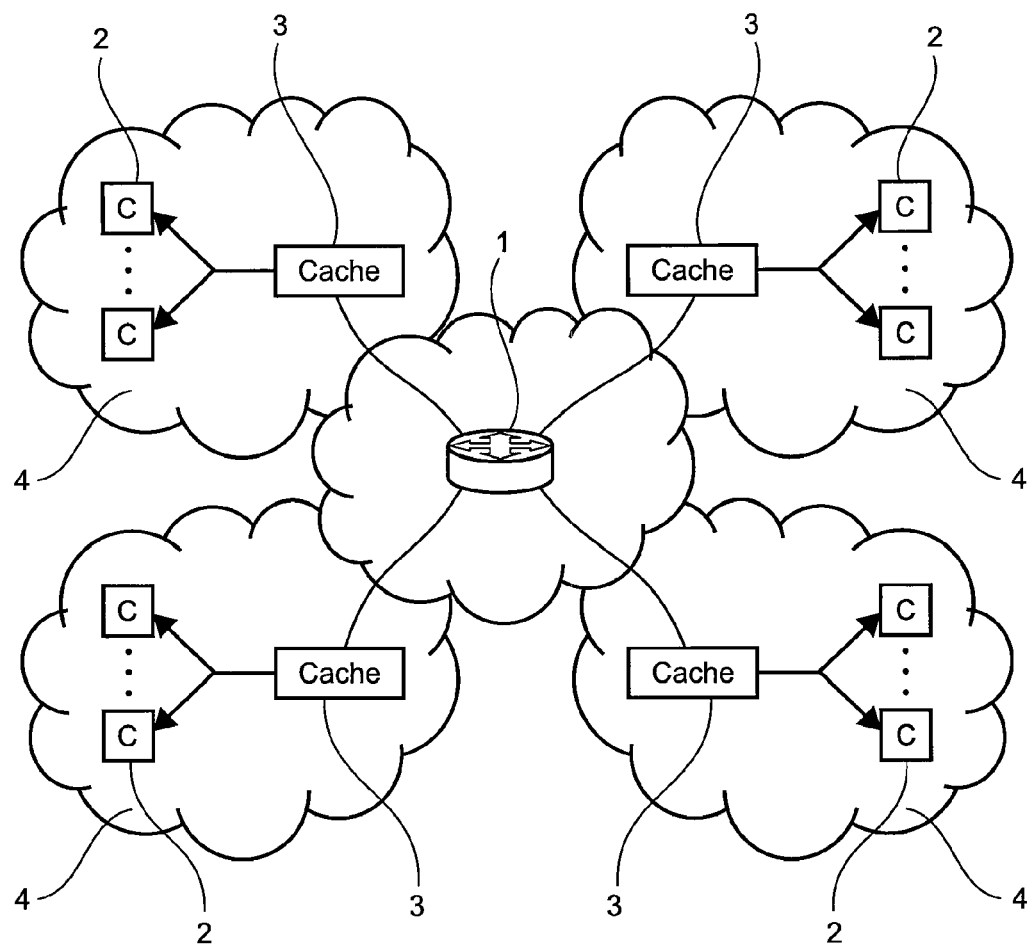
FIG. 8 shows PSNR profit in a lossy environment varying with the number of videos in the system.
Figure 9:
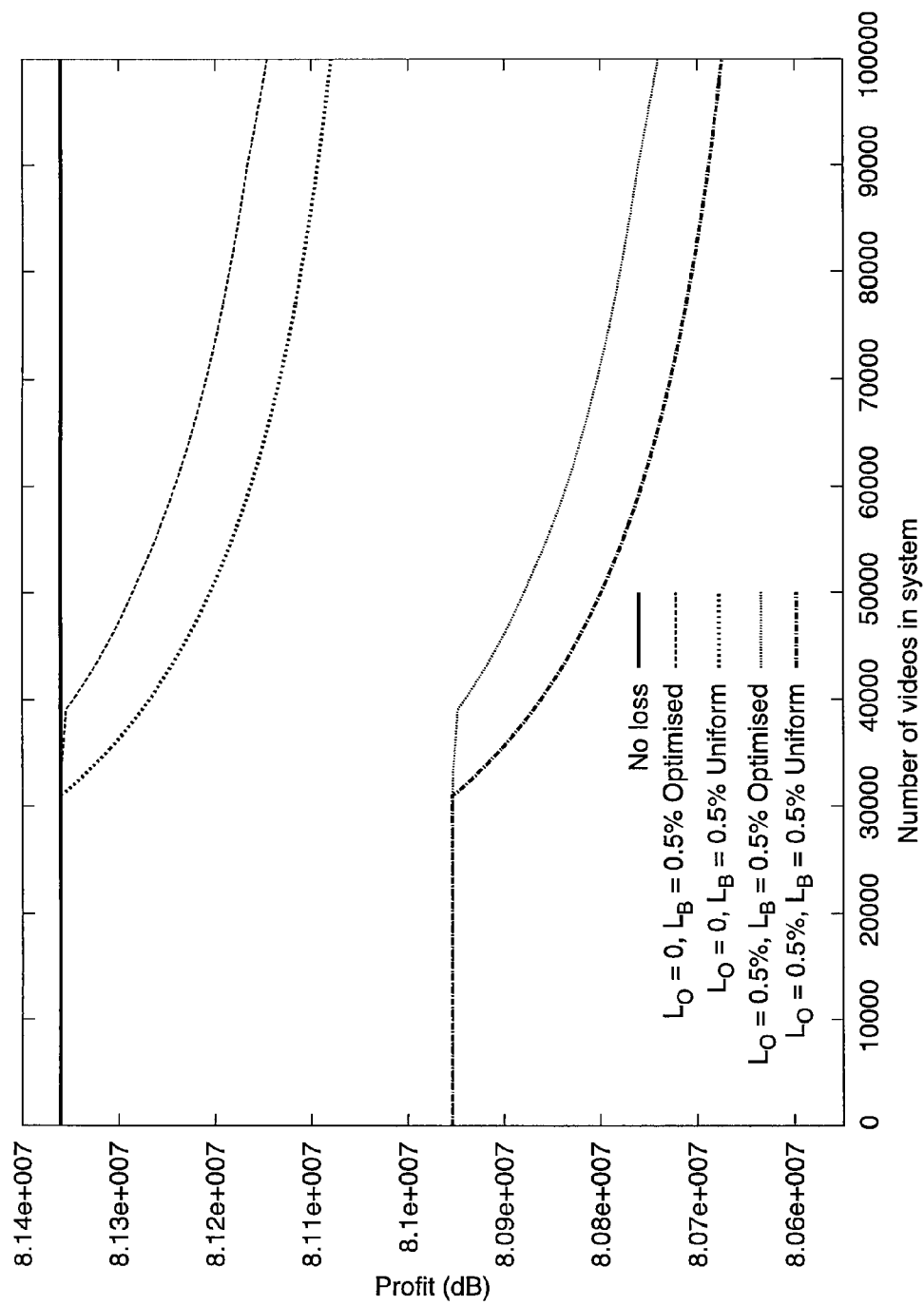
FIG. 9 shows an example of a caching network.

FIG. 8 shows the effect that losses have on the resulting PSNR profit received by the client 2 and how this is affected by the number of videos in the system. The number of clients 2 is less than the bound imposed in FIG. 6, as such the effect present in FIG. 7 does not occur. As can be seen, in all lossy cases, the optimised cache outperforms the uniform cache.

4. CACHING NETWORK

Referring to FIG. 8, in a caching network multiple caches 3 may be provided, potentially within multiple different AS networks 4. These caches 3 can be arranged to co-operate to ensure that copy of a video persists somewhere in the cache network. Within the previously proposed arrangement where only an individual cache was considered it would not be possible to ensure that a video remained available as the number of videos within the system grows. Instead of allowing the number of each partition stored on a cache server 3 to fall to zero a minimum value can be fixed of each partition to be stored or the minimum value can be varied. This is controlled and configured by the network as a whole. There are potentially many techniques for doing this, which are known in general in the prior art. These are not discussed in detail herein". The remaining capacity in the cache servers 3 is used to cache substreams according to their profit in the previously described method, i.e. caching higher profit substreams in preference to lower profit substreams.

By fixing the minimum number of videos completely stored on a cache server 3, the number of cache servers 3 required will vary dependent on the number of videos within the system and will be equal to $$S_{Fixed} = \begin{cases} N & \alpha \geq 0 \\ \dfrac{V \times N}{F} & \alpha < 0 \end{cases} \quad (17)$$

Where $S_{Fixed}$ is the number of cache servers 3 required when the minimum number of videos to be stored on a cache server 3 is fixed. F is the number of videos which are guaranteed to be stored on each cache server 3 and N is the number of copies of each video to be stored in the network on different cache servers 3. If each server 3 has enough space to store all of the partitions of all of the videos then you need N servers 3 (the $\alpha \geq 0$ case). If there is not enough space on each server 3 to store all the N videos (the $\alpha < 0$ case), then the total amount of space needed is Cap×V×N (where V is the total number of videos and Cap is the (average) storage capacity needed per video). Each server gives F×Cap space to storing "complete" copies (where F is the number it has to store). Dividing the total needed by the provision per server 3, this gives the total number of servers needed.

In a preferred embodiment, $\alpha$ is the amount of storage space used on the cache server 3 but with sufficient space to store all the partitions of the least important partition and frame type for N videos.

$$\alpha = S + (V - N) \cdot \beta - V \cdot \sum_{t \in \{K,I,B\}} \sum_{p \in \{A,B,C\}} A_{t,p} \cdot W_{t,p} \quad (18)$$

Where $\beta$ is equal to $A_{t,p} \times W_{t,p}$ for the values of t,p which minimises $P_{t,p}/W_{t,p}$.

Alternatively by fixing the number of cache servers 3, the number of videos which need to be stored on each cache server 3 can be found by $$F_{Variable} = \frac{V \times N}{S} \quad (19)$$

Where S is the number of cache servers 3 within the network and $F_{Variable}$ is the number of videos to be stored at a cache server 3 when the number of cache servers 3 is fixed and the number of videos can change.

Figure 10:
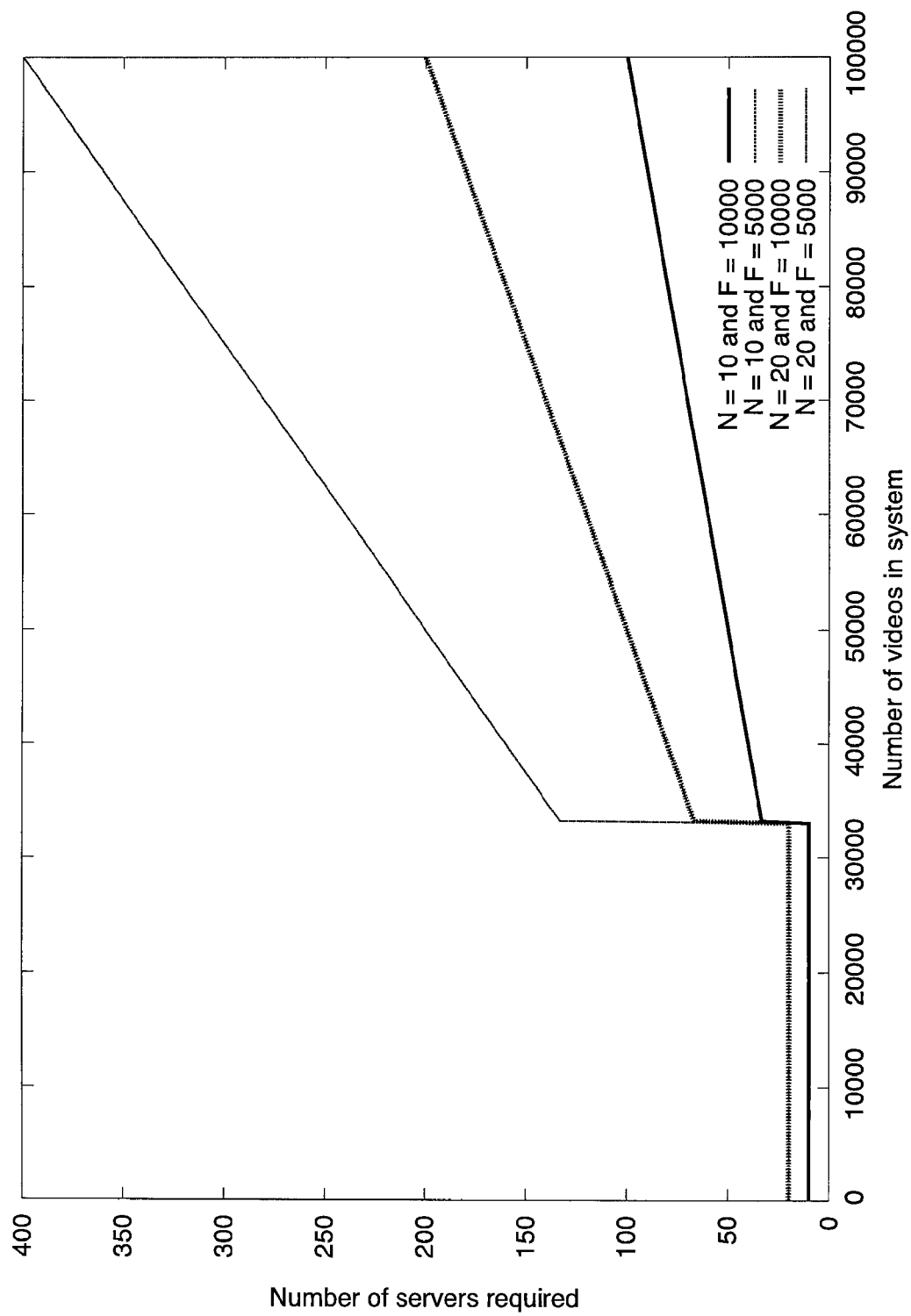
FIG. 10 shows the number of servers required to store N copies of all videos when F videos are stored per server under different conditions; and, FIG. 11 shows the percentage of storage space allocated to long term storage when F videos are stored on S servers.

FIG. 10 presents four scenarios with different N and F parameters. As an example in the case where N=10 and F=10,000 this means that there will be sufficient space allocated to store 10 complete copies of every video across all the caches 3, with each cache 3 storing 10,000 complete videos on each server. The storage space required for storing 10,000 complete videos is 32.34% of the complete storage space available.

Figure 11:
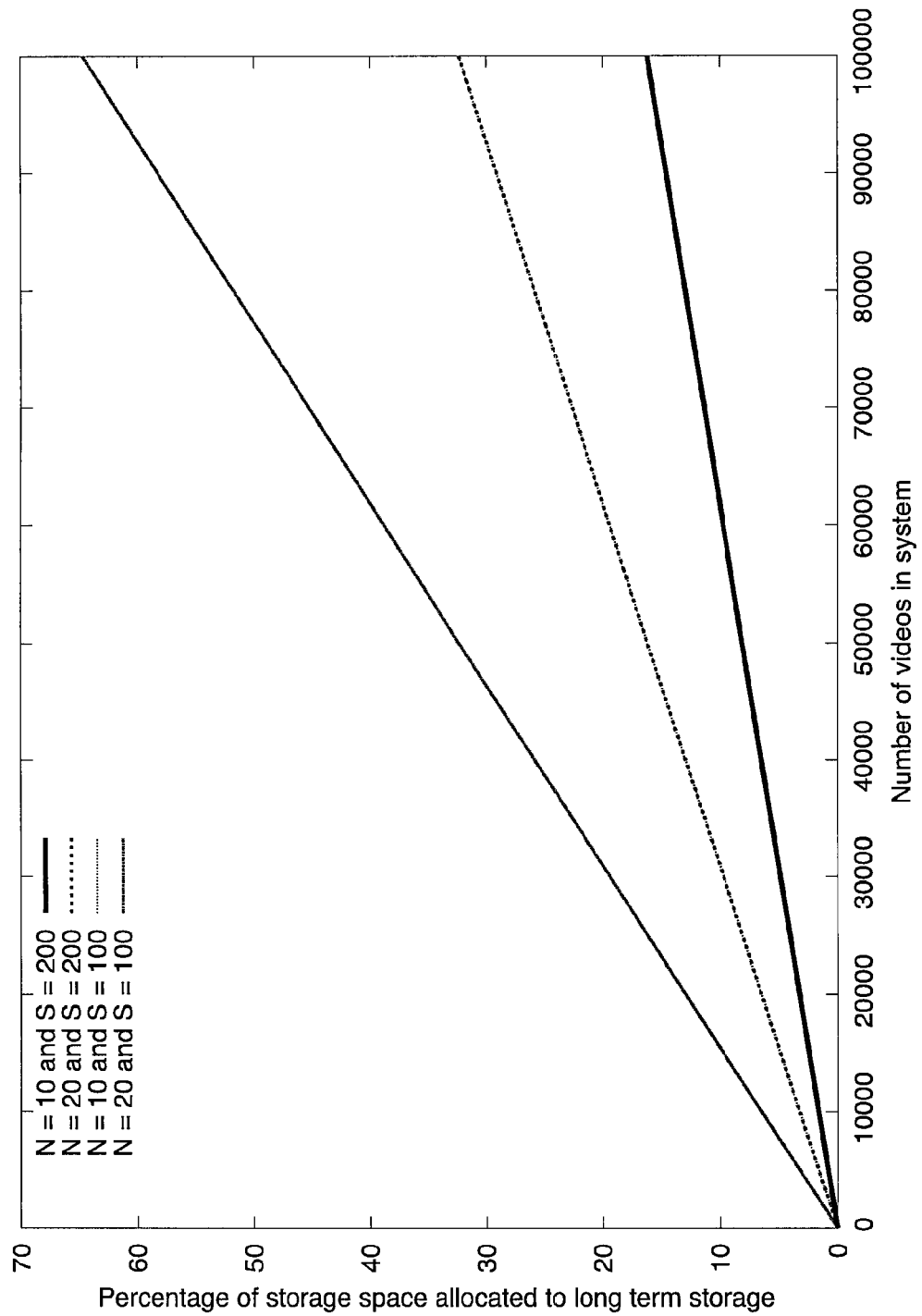

The results presented in FIG. 11 distribute N copies of a video over S cache servers 3 equally. The results show the percentage of storage which is allocated to the storing of complete videos, the remainder of the storage will is used in the previously proposed optimised proportions.

Thus, a minimum number of videos can be made to persist in the network, whilst space capacity in the network can be optimised to store the more profitable substreams.

Embodiments of the present invention have been described with particular reference to the examples illustrated. However, it will be appreciated that variations and modifications may be made to the examples described within the scope of the present invention.

The invention claimed is:

1. A method of evaluating a profit of a substream of encoded video data, the video data comprising plural substreams of encoded video data, the substreams comprising different frame types and different partition types, the method comprising:
    separating the substream being evaluated into a plurality of data portions comprising at least some of the data in the substream being evaluated;
    comparing, for each data portion in turn, using a calculator, a decoded version of the video with the data portion present and a decoded version of the video with the data portion removed and calculating using the calculator an error metric indicative of a distortion between the two versions; and,
    averaging the error metric for the plural data portions; and,
    calculating a profit for the substream being evaluated dependent upon the averaged error metric,
    wherein the error metric is a peak signal to noise ratio, such that the profit of the substream having a frame type t and a partition type p is given by:

$$P_{t,p} = \frac{\sum_{r \in T_{t,p}} \sum_{f=1}^{F} (PSNR_f - PSNR_{f,r,p})}{|T_{t,p}|}$$

where $PSNR_f$ is the peak signal to noise ratio for a decoded frame f of the video, and $PSNR_{f,r,p}$ is the peak signal to noise ratio for frame f of the video missing a particular data portion having a frame type t and a partition type p, $T_{t,p}$ is a set containing the indexes of the frames of type t containing partition p, and F is the number of frames in the video.

2. A method of operating a cache server, the cache server being connected in a network between one or more clients and a content server, and operable to cache objects requested from a client from the content server and to provide said cached object to a client when subsequently requested, the method comprising:
    determining at the cache server a profit of a plurality of substreams in a video stream object requested by a client, the profit being determined by:
        identifying a data portion comprising at least some of the data in the substream being evaluated;
        comparing a decoded version of the video with the data portion present and a decoded version of the video with the data portion removed and calculating an error metric indicative of the distortion between the two versions; and,
        calculating a profit for the substream dependent upon the error metric, wherein the error metric is the peak signal to noise ratio, such that the profit of the substream having a frame type t and a partition type p is given by:

$$P_{t,p} = \frac{\sum_{r \in T_{t,p}} \sum_{f=1}^{F} (PSNR_f - PSNR_{f,r,p})}{|T_{t,p}|}$$

where $PSNR_f$ is the peak signal to noise ratio for a decoded frame f of the video, and $PSNR_{f,r,p}$ is the peak signal to noise ratio for frame f of the video missing a particular data portion having a frame type t and a partition type p, $T_{t,p}$ is a set containing the indexes of the frames of type t containing partition p, and F is the number of frames in the video; and caching one or more substreams with a determined higher profit in preference to one or more substreams with a predetermined lower profit.

3. A method according to claim 2, comprising using a knapsack problem approach to maximizing the total profit of videos stored at the cache server to decide which substreams to store at the cache.

4. A method according to claim 2, wherein finding the profit of a substream comprises:
determining encoding parameters of the video stream; and, finding in a lookup table an average profit value for a substream encoded with those parameters.

5. A method according to claim 2, wherein finding the profit of a substream comprises:
calculating the profit for individual substreams.

6. A method according to claim 2, comprising, if a substream of a requested video is not in the cache, requesting the substream from the content server;
determining the profit of the substreams in a video stream not in the cache and requested from the content server, the profit being determined in accordance with the method of claim 1; and,
forwarding from the content server to the cache server the substreams with the higher profit in preference to substreams with lower profit.

7. A method according to claim 2, comprising:
setting a minimum value for the number of instances of a video that persist in a caching network of cache servers;
maintaining said minimum number in said caches of said cache servers; and,
using any additional capacity in the cache servers to store substreams in accordance with their profit.

8. A method of operating a content server, the content server being operable to forward substreams of video data stored at the content server in response to requests, the method comprising:
receiving at the content server requests for substreams of video data;
determining a profit of the requested substreams, the profit being determined by:
identifying a data portion comprising at least some of the data in the substream being evaluated;
comparing a decoded version of the video with the data portion present and a decoded version of the video with the data portion removed, and
calculating an error metric indicative of the distortion between the two versions; and,
calculating a profit for the substream dependent upon the error metric, wherein the error metric is the peak signal to noise ratio, such that the profit of the substream having a frame type t and a partition type p is given by:

$$P_{t,p} = \frac{\sum_{r \in T_{t,p}} \sum_{f=1}^{F} (PSNR_f - PSNR_{f,r,p})}{|T_{t,p}|}$$

where $PSNR_f$ is the peak signal to noise ratio for a decoded frame f of the video, and $PSNR_{f,r,p}$ is the peak signal to noise ratio for frame f of the video missing a particular data portion having a frame type t and a partition type p, $T_{t,p}$ is a set containing the indexes of the frames of type t containing partition p, and F is the number of frames in the video; and, forwarding with the content server the substreams with higher profit in preference to substreams with lower profit.

9. A method according to claim 8, comprising using a knapsack problem approach to maximizing the total profit of videos forwarded by the content server.

10. A method according to claim 8, wherein finding the profit of a substream comprises:
determining encoding parameters of the video stream; and, finding in a lookup table an average profit value for a substream encoded with those parameters.

11. A method according to claim 8, wherein finding the profit of a substream comprises:
calculating the profit for individual substreams.

12. A cache server connectable in a network between one or more clients and a content server, and operable to cache objects requested from a client from the content server and to provide said cached object to a client when subsequently requested, the cache server comprising:
a calculator configured to determine a profit of substreams in a video stream object requested by a client, the profit being determined in accordance with the method of claim 1, wherein the cache server is configured to cache the substreams with the higher profit in preference to substreams with lower profit.

13. A content server operable to forward substreams of video data stored at the content server in response to requests, the content server comprising:
an input to receive requests for substreams of video data, wherein a profit of the requested substreams is determined in accordance with the method of claim 1; and
an output to forward the substreams with higher profit in preference to substreams with lower profit.

14. A network comprising at least one cache server according to claim 12 and at least one content server, the content server operable to forward substreams of video data stored at the content server in response to requests, the content server comprising:
an input to receive requests for substreams of video data; and
an output to forward the substreams with higher profit in preference to substreams with lower profit.

15. Apparatus for evaluating the profit of a substream of encoded video data, the video data comprising plural substreams of encoded video data, the substreams comprising different frame types and different partition types, the apparatus comprising:
an encoder arranged to receive and encode an original video file into a plurality of encoded video substreams;
a controller arranged to separate the substream being evaluated into a plurality of data portions comprising at least some of the data in the substream being evaluated;
a decoder arranged to receive said video data and produce decoded a version of the video with the data portion present;
a decoder arranged to receive said video data and produce decoded a version of the video with the data portion removed for each data portion in turn;
a calculator arranged to compare for each data portion in turn the two decoded versions with and without the data portion and to calculate an error metric indicative of the distortion between the two versions, the calculator being arranged to average the error metrics for the plural data portions and to calculate the profit for the substream being evaluated dependent upon the averaged error metric, wherein the error metric is a peak signal to noise ratio, such that the profit of the substream having a frame type t and a partition type p is given by:

$$P_{t,p} = \frac{\sum_{r \in T_{t,p}} \sum_{f=1}^{F} (PSNR_f - PSNR_{f,r,p})}{|T_{t,p}|}$$

where $PSNR_f$ is the peak signal to noise ratio for a decoded frame f of the video, and $PSNR_{f,r,p}$ is the peak signal to noise ratio for frame f of the video missing a particular data portion having a frame type t and a partition type p, $T_{t,p}$ is a set containing the indexes of the frames of type t containing partition p, and F is the number of frames in the video.

* * * * *